ary Examiner.

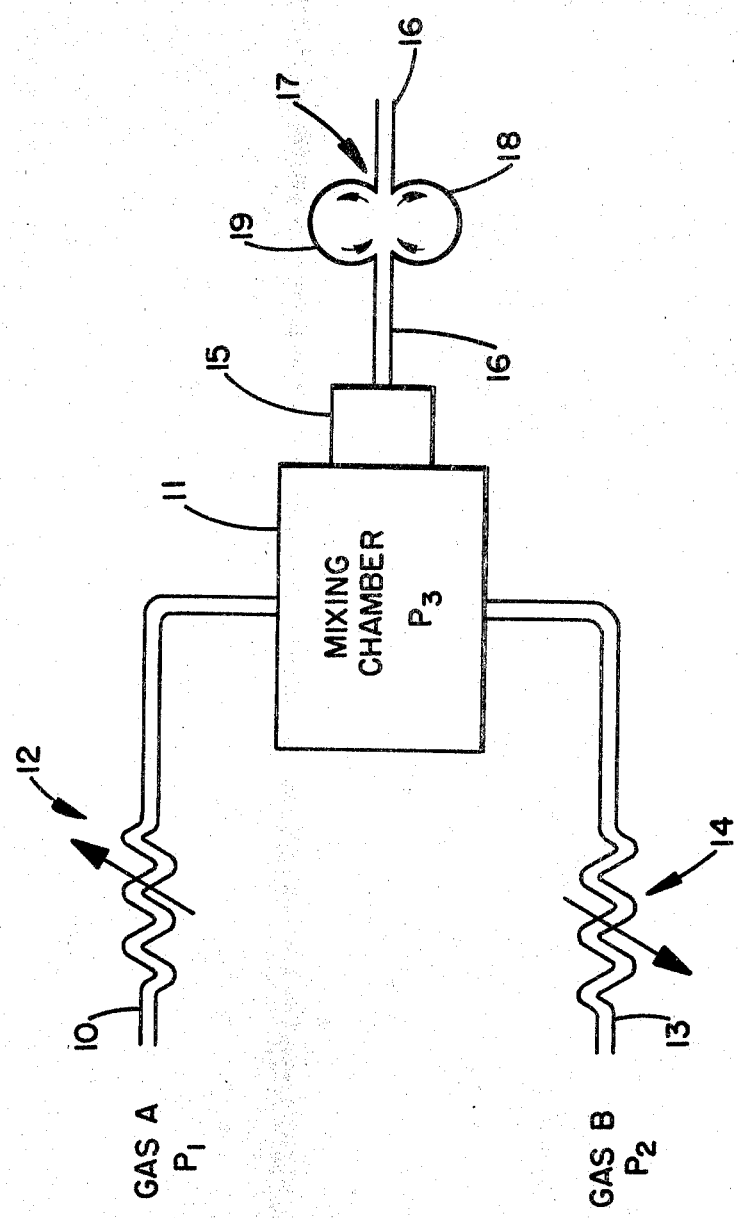

United States Patent Office 3,321,955
Patented May 30, 1967

3,321,955
FLUID ANALOG TO DIGITAL CONVERTER
Richard W. Hatch, Jr., Norwell, Mass., assignor to The Foxboro Company, Foxboro, Mass., a corporation of Massachusetts
Filed June 24, 1964, Ser. No. 377,610
1 Claim. (Cl. 73—30)

This invention relates to dynamic fluid systems on a continuous flow basis and has particular reference to means for changing an analog fluid signal to a digital fluid signal.

As a specific illustration of this device, two different gas imputes are applied to a mixing chamber, with one gas at a fixed pressure and the other at a variable pressure.

The output of the mixing chamber is applied through a pressure regulator to a fluid device of the whistle type which produces a frequency which is a function of the variable pressure input to the mixing chamber.

This invention therefore provides a new and useful fluid device in the form of an analog to digital converter.

Other objects and advantages of this invention will be in part apparent and in part pointed out hereinafter and in the accompanying drawing, wherein:

The drawing is a schematic illustration of a converter system according to this invention.

In the drawing there is provided a source of gas A as indicated at 10, wherein gas is applied at $P_1$ fixed pressure and might be, for example, the set point of a control system. This gas is applied to a mixing chamber 11 through a variable tuning restrictor 12.

A second gas B, at a second, and variable pressure, $P_2$, is applied to the mixing chamber 11 through an input 13 by way of a variable tuning restrictor 14. Gas B in this illustration, represents a variable condition such as a measurement.

In the output of the mixing chamber, a pressure regulator 15 is provided in an output passage 16. In this passage 16 a fluid whistle device 17 is provided wherein gas flow circulates back through two opposite lateral circular formation recesses 18 and 19 on a counter-flow basis. These flows come again forwardly to the main flow passage, and set up vibrations in the nature of the whistle phenomenon so that the output of the device in output passage 16 is pulsating at a particular frequency. This frequency is representative of the composition of the gas mixture in the mixing chamber and thus varies according to the composition variance of the measurement input, gas B. Gas A is fixed in composition.

The whistle device works on the principle that sound travels at different speeds in different gases and mixtures of gases. A velocity of sound whistle will operate at different frequencies when blown with different gases or mixtures.

Thus variable pressure of gas B provides varying amounts and thus mixture of gases A and B in the mixing chamber. The pressure regulator 15 maintains the mixing chamber at a fixed pressure so the whistle 17 reacts to different mixtures at the same pressure.

The frequency of the whistle output is picked up by any suitable readout means (not shown).

This invention therefore provides a new and useful fluid analog to digital converter based on the frequency producing capabilities of the device of the whistle form.

As many embodiments may be made of the above invention, and as changes may be made in the embodiments set forth above without departing from the scope of the invention, it is to be understood that all matter herein before set forth or shown in the accompanying drawing is to be interpreted as illustrative only and not in a limiting sense.

I claim:

A fluid analog to digital converter comprising a mixing chamber in the form of a simple enclosure without gas separating effects, a first input pipe line continuously open to said mixing chamber at one point for gas A at a predetermined pressure, a variable restrictor in said first input pipe line, a second input line continuously open to said mixing chamber at another point for gas B at a predetermined pressure, a second variable restrictor in said second input pipe line, a single output passage from said mixing chamber for receiving said gases as mixed, a pressure regulator in said output passage, and a whistle form of frequency producer in said outlet passage downstream of said pressure regulator, whereby the frequency of the output whistle of said frequency producer is a continuous function of the composition of the mixed gas continually flowing in said chamber, as established by said continuous inputs of gas A and gas B at said predetermined pressures thereof.

References Cited

UNITED STATES PATENTS

| | | | |
|---|---|---|---|
| 2,755,767 | 7/1956 | Levavasseur | 137—81.5 X |
| 2,874,564 | 2/1959 | Martin et al. | 73—24 |
| 2,910,830 | 11/1959 | White | 137—81.5 X |
| 2,986,899 | 6/1961 | Schenk et al. | 137—111 X |
| 3,209,774 | 10/1965 | Manion | 137—81.5 |
| 3,229,501 | 1/1966 | Henze et al. | 73—23 |
| 3,233,522 | 2/1966 | Stern | 137—81.5 X |
| 3,238,959 | 3/1966 | Bowles | 137—81.5 |
| 3,273,377 | 9/1966 | Testerman et al. | 73—23 |

FOREIGN PATENTS

| | | |
|---|---|---|
| 137,439 | 9/1952 | Sweden. |
| 1,318,907 | 1/1963 | France. |

M. CARY NELSON, *Primary Examiner.*

S. SCOTT, *Assistant Examiner.*